Aug. 4, 1936.    W. O. LYTLE ET AL    2,049,850
SHEET LOADING APPARATUS
Filed Oct. 16, 1935    3 Sheets-Sheet 1

INVENTOR.
W. O. LYTLE AND
E. A. FUSCA
BY Bradley T Bee
ATTORNEYS.

Aug. 4, 1936.                W. O. LYTLE ET AL                2,049,850
                          SHEET LOADING APPARATUS
                           Filed Oct. 16, 1935                3 Sheets-Sheet 2
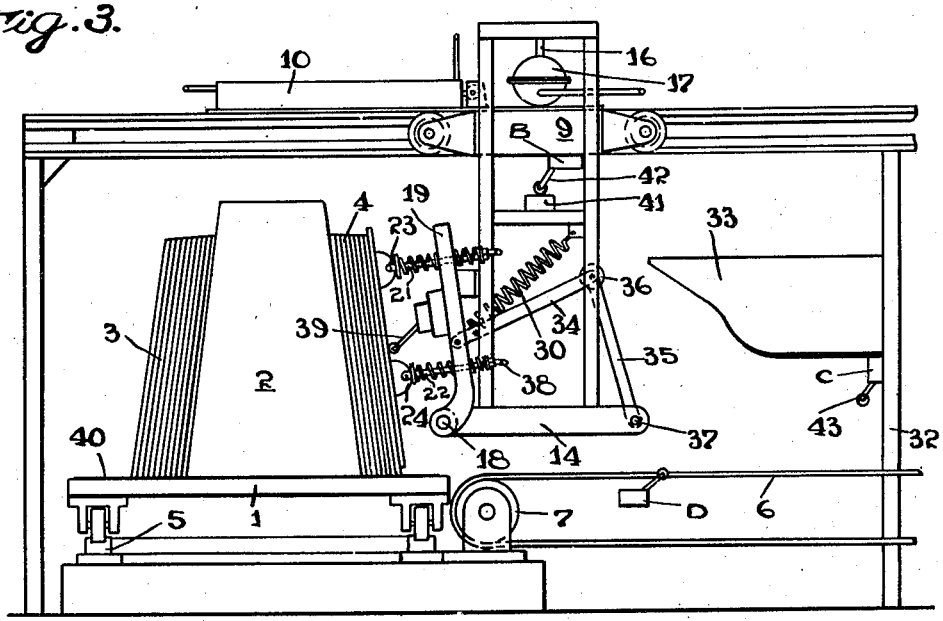
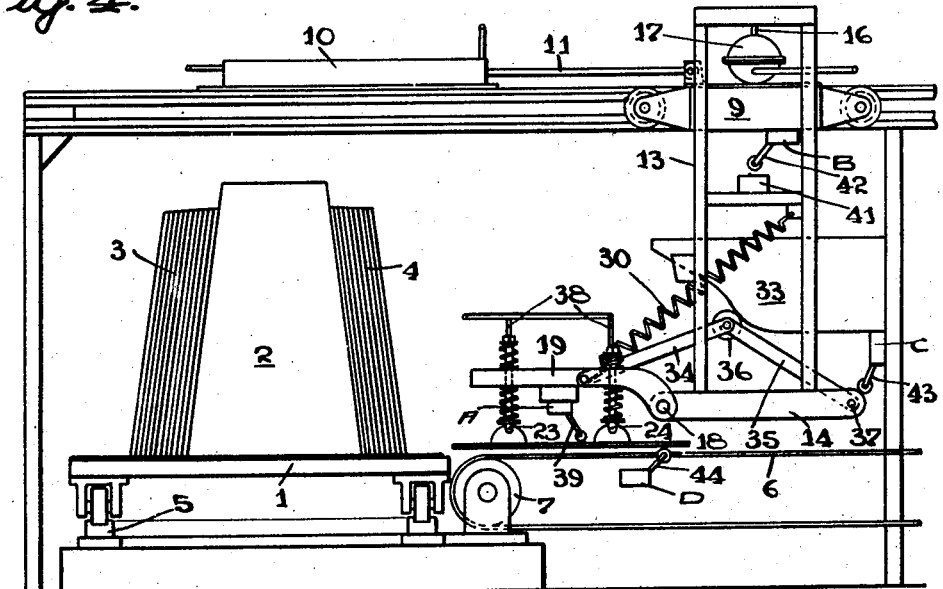
INVENTOR.
W. O. LYTLE AND
E. A. FUSCA
BY Bradley & Bee
ATTORNEYS.

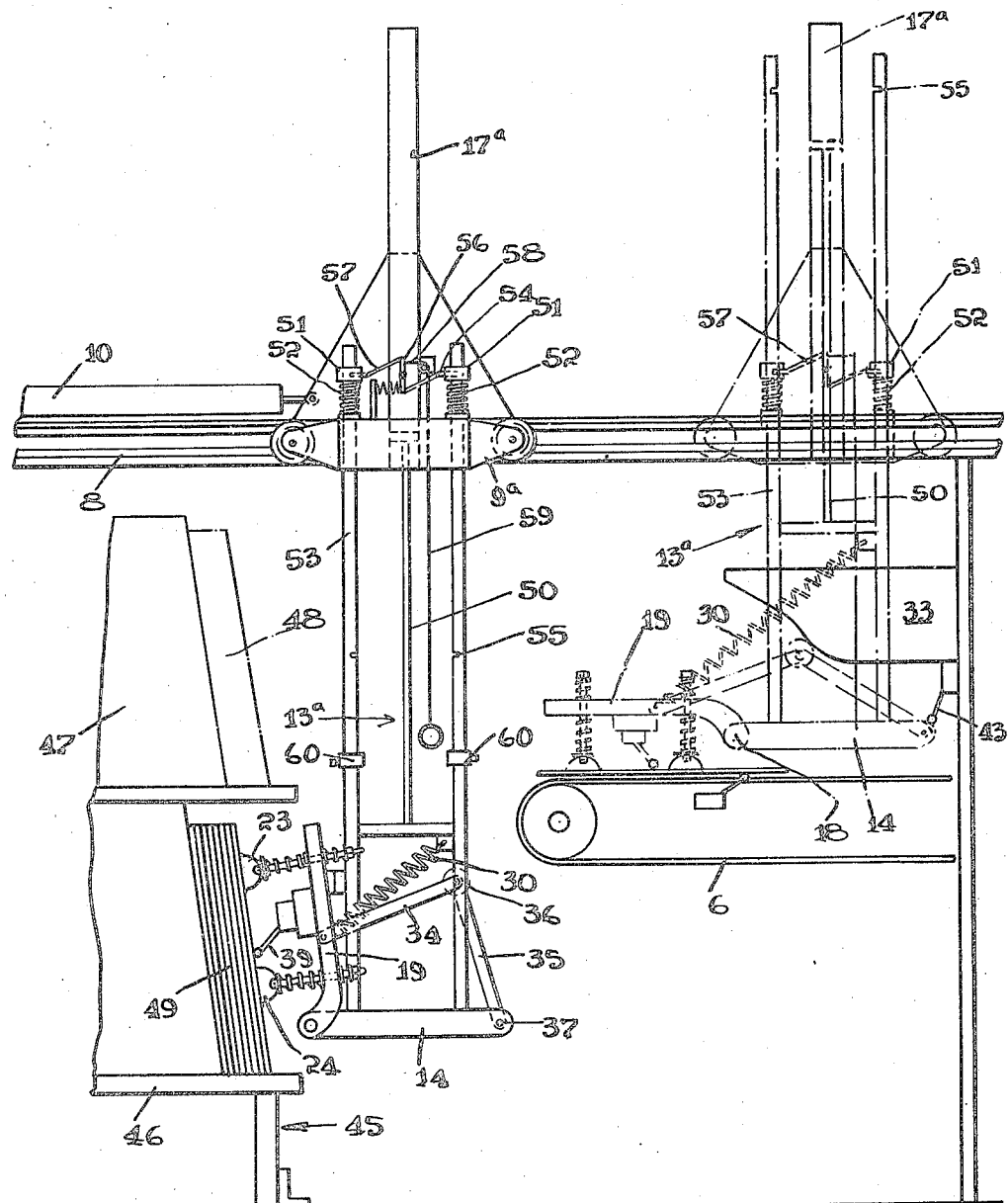

Patented Aug. 4, 1936

2,049,850

UNITED STATES PATENT OFFICE 2,049,850

SHEET LOADING APPARATUS

William O. Lytle, New Kensington, and Emil A. Fusca, Perrysville, Pa., assignors to Duplate Corporation, a corporation of Delaware Application October 16, 1935, Serial No. 45,242

5 Claims. (Cl. 214—1)

Figure 1:
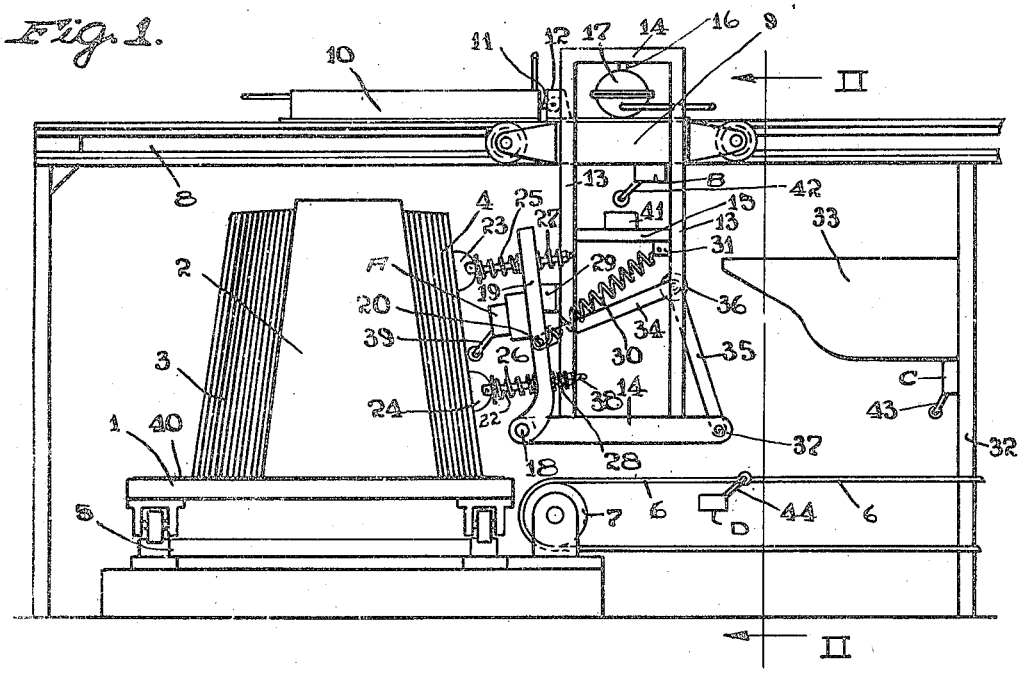
Figure 2:
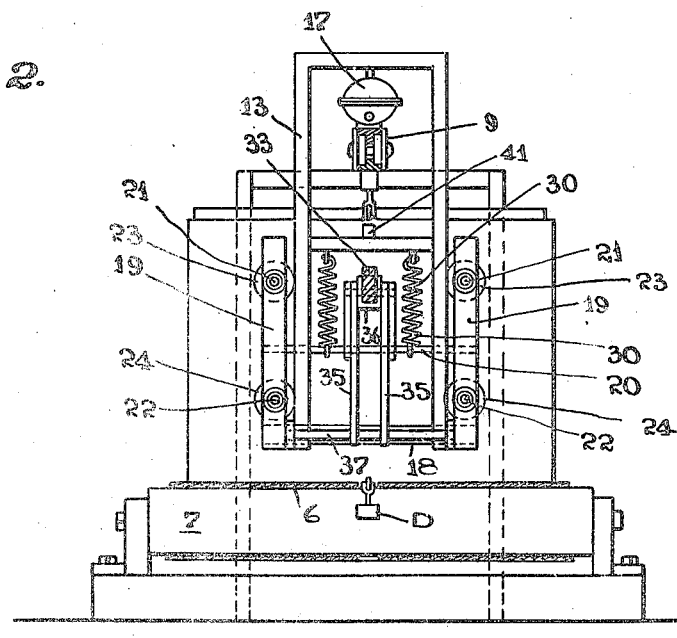

The invention relates to sheet loading apparatus and is designed particularly for handling glass sheets which are brought to the apparatus in stacks where they are supported in upright position and transferred one by one to a horizontal conveyor. The invention has for its objects the provision of an improved loading apparatus of simple construction suitable for automatic operation; which will operate to transfer the glass sheets positively and without breakage; which will operate to pick up one sheet at a time without disturbing the remaining sheets of the pack and which requires a minimum of attention on the part of the operator. One embodiment of the invention is illustrated in the accompanying drawings, wherein:

Figure 1 is a side elevation of the apparatus with the parts in starting position. Fig. 2 is a section on the line 2, 2 of Fig. 1. Fig. 3 is a side elevation similar to that of Fig. 1, but with the parts in the position occupied in the second stage of the operation with the depending lifting frame moved upward slightly from the position of Fig. 1. And Fig. 4 is a side elevation showing the parts in the position occupied at the time of delivery of a glass sheet to the conveyor. And Fig. 5 is a side elevation of a modification.

Referring to the drawings, 1 is a table provided with a frame 2 for supporting the stacks of glass sheets 3 and 4 in the position illustrated, the table being mounted upon a circular track 5 so that after the sheets of the pack 4 have been removed, the table may be rotated through 180 degrees bringing the pack 3 to delivery position. It will be understood in this connection that any suitable means other than the rotary table may be employed for supporting a pack of sheets, the only requirement being that such pack be supported in an upright position at a slight angle of inclination.

At one side of the table 1 is a conveyor preferably in the form of the split belt 6 which passes around a pair of pulleys, one of which, 7, is shown, such belt being driven by suitable means, not shown, under the control of the operator so that the movement of the belt may be started and stopped to meet requirements. This belt is shown as extending in a direction away from the table, but it will be understood that this is not an essential as the belt may extend transversely of the position shown and any other suitable conveying means may be substituted for a belt. Located above the table and conveyor is a track 8, upon which is mounted a carriage 9 adapted to be moved back and forth along the track by means of the cylinder 10 which is mounted in fixed position and provided with a plunger 11 which is attached to an abutment 12 secured to the carriage. Mounted for sliding vertical movement through the carriage is a depending frame made up of four members 13 suitably secured together at their lower and upper ends by the transverse members 14 and by the intermediate tie members 15. In order to provide for the up and down movement of the frame, it is carried by a plunger 16 which is extended into the casing 17 and attached to a diaphragm, provision being made for supplying air to the casing below the diaphragm and exhausting it therefrom in order to give the relatively slight vertical movement required as hereinafter explained.

Pivotally mounted at the lower end of the depending frame upon the transverse members 14, as indicated at 18, is a vacuum frame made up of the side members 19, 19 secured together intermediate their ends by the tie bar 20. This vacuum frame carries the rods 21, 21 and 22, 22, which extend slidably through the members 19, 19 and have pivoted to their inner ends the vacuum cups 23, 23 and 24, 24. The cups are maintained yieldingly in their forward positions by means of coiled springs 25, 25 and 26, 26, other coil springs 27, 27 and 28, 28 being mounted on the rods back of the frame members 19, 19 so that in the movement of the frame away from the table, a yielding pull is applied to the vacuum cups. When in pick-up position, as indicated in Fig. 1, the vacuum frame is held against swinging movement to the right by means of stop member 29 carried by the depending frame members 13.

The frame is yieldingly held against the stop members 29, 29 by means of a pair of springs 30, 30 secured at one end to the tie rod 20 and at their other ends to suitable brackets 31 which are attached to the depending frame. Located to the rear of the depending frame and supported upon the framework 32 is a cam 33 which is designed to swing the vacuum frame from the position shown in Fig. 1 to the position shown in Fig. 4 when the depending frame is moved to the right. This is accomplished by the use of the link members 34 and 35 pivoted together and carrying a roller 36, the link members 34 being pivoted at their left hand ends upon the tie bar 20, while the link members 35 are pivoted at their lower ends upon a transverse rod 37 carried by the frame members 14. As the frame moves to the right, the roller 36 engages the cam 33 and swings the arms 19 to the horizontal position shown in Fig. 4. On the movement of the depending frame to the left, this movement is reversed due to the springs 30 and the arms 19 are returned to the upright position shown in Fig. 1 when the roller 36 is disengaged from the cam.

The operation of the apparatus is as follows: The depending frame on its movement to the left arrives at the position shown in Fig. 1, this movement being accomplished by the operating cylinder 10. When the vacuum cups engage the outer sheet of glass of the pack 4, attachment to such sheet is accomplished by exhausting the air from the cups. This exhaust of air is accomplished by the use of suitable connections 38 connected to an exhausting apparatus, and this action is preferably controlled automatically by the use of a limit switch A carried by the vacuum frame and provided with an arm 39, which engages the glass sheet, and through suitable mechanism controls the exhaust of air from the cups. When the vacuum thus supplied reaches a suitable point, air is admitted to the under side of the lifting diaphragm in the casing 17 and such diaphragm moves the lifting frame vertically a short distance, as indicated in Fig. 3. This upward movement of the sheet of glass assists in releasing it from the pack and also serves to lift the lower edge of the sheet free from the table, the purpose being to release the sheet, so that no difficulty will be experienced in moving it away from the pack when the depending frame, which carries the vacuum frame, is moved to the right. The table 1 is ordinarily provided on its upper surface with a sheet 40 of rubber or felt in order to give a yielding support for the edges of the glass sheets and the upward movement of the sheet of glass carried by the vacuum cups is desirable in order to free it from this yielding sheet 40.

When the frame reaches the vertical position, shown in Fig. 3, the stop 41 carried by the frame member 15 engages the arm 42 of the limit switch B, and through suitable mechanism this limit switch stops the flow of air to the diaphragm casing and causes an admission of air to the cylinder 10 so that the carriage 9 is moved to the right from the position of Fig. 3 to the position of Fig. 4. The springs 28 on the rods carrying the vacuum cups 24 are somewhat stiffer than the springs 27 on the rods carrying the cups 23 so that the lower edge of the class sheet is moved out in advance of the upper edge so that the sheet has less tendency to stick to the next sheet than would otherwise be the case. During the further movement of the carriage to the right, the cam 33 is engaged by the roller 36, and the vacuum frame swung to the position illustrated in Fig. 4, at which time it supports the glass sheet in a horizontal position just above the belt. When the carriage arrives at this position, the frame member 14 engages the arm 43 of a limit switch C, and through suitable mechanism the flow of air to the cylinder 10 is stopped and the air beneath the lifting diaphragm in the casing 17 is exhausted, permitting the frame to move downward. At the same time, the vacuum existing in the air cups is broken, so that the glass sheet may drop onto the belt. This releases the arm 39 of the limit switch A which controls the admission of air to the cylinder 10, causing the movement of the carriage from the position of Fig. 4 back to the position of Fig. 1. A limit switch D is also preferably employed located beneath the upper flight of the belt 6, and having an arm 44 which projects between the two sections of the belt, as indicated in Fig. 2. This limit switch lies in the circuit controlling the operation, and as long as the arm 44 is held down by a glass sheet, the limit switch C is rendered ineffective to operate as heretofore described, so that in case there is a sheet of glass on the belt when the vacuum frame swings down to deposit another sheet, this operation will not become effective until the sheet already on the belt has been moved out of the way, thus releasing the arm 44.

The details of the electrical circuits and mechanisms under the control of the limit switches A, B, C, and D are not illustrated, and no claim is made thereto, as such apparatus is well known to those skilled in the art and may be assembled in a wide variety of ways by the use of standard equipment to accomplish the automatic functioning of the apparatus.

Fig. 5 illustrates a modification which adapts the apparatus for transferring the sheets from packs located at different levels. Under this condition, the sheets are brought to a position adjacent the transfer device on so-called A racks 45, which are transported by suitable trucks and set down on the floor, as illustrated. When the rack is emptied, it is removed by the trucks and a second loaded rack is brought into position. The rack comprises a base 46 and a central part 47 against which the packs 48 and 49 are supported with the sheets in inclined position. The depending frame 13a is mounted for a more extended vertical movement than in the construction heretofore described, and the vertical movement is accomplished by the air cylinder 17a having the plunger 50 which takes the place of the parts 16 and 17 of the first construction. The stroke of the plunger is regulated so that sheets may be removed from the packs 48 and 49 at the two different levels and transferred to the conveyor 6 by the procedure heretofore described. The downward movement of the depending frame 13a is governed by the adjustable collars 51 which engage the cushioning springs 52 when the frame reaches its lower extreme of movement. The collars are locked in position on the rods 53 by means of retractable pins 54 (spring pressed inwardly), slidably mounted in the collars and adapted to engage recesses 55 in the rods. The pins are reciprocated by a crank 56 whose ends are connected to the pins by the rods 57, the crank itself being turned by an arm 58 to which is secured an operating cord 59. The upward movement of the frame is limited by the collars 60 on the rods 53. In other respects the construction and its operation is similar to the one of Figs. 1 to 4.

If desired, the direction of operation of the devices of both forms of construction may be reversed in order to remove sheets from the conveyor and place them in stacks upon the racks.

What we claim is:
1. A sheet feeding apparatus comprising a table provided with means for supporting a pack of sheets in upright position at an angle to the vertical, a conveyor at one side of the table in parallel with the supporting face of the table, a track above the table and conveyor, a support mounted for movement back and forth along the track, means for moving the support along the track, a depending frame carried by the support, a vacuum frame pivoted at one end to the depending frame and provided with vacuum engaging means, said frame being adapted to swing from an upright position parallel to the faces of the sheets to a horizontal position parallel to said conveyor, spring means normally holding the frame in said upright position, and means operated on the movement of the support which carries the depending frame away from the table for swinging the vacuum frame from upright position to horizontal position to deposit the sheet carried thereby upon the conveyor.

2. A sheet feeding apparatus comprising a table provided with means for supporting a pack of sheets in upright position at an angle to the vertical, a conveyor at one side of the table in parallel with the supporting face of the table, a track above the table and belt, a support mounted for movement back and forth along the track, means for moving the support along the track, a depending vertically movable frame carried by the support, means for raising and lowering the frame, a vacuum frame pivoted at one end to the depending frame and provided with vacuum engaging means, said frame being adapted to swing from an upright position parallel to the faces of the sheets to a horizontal position parallel to said conveyor, spring means normally holding the frame in said upright position, and means operated on the movement of the support which carries the depending frame away from the table for swinging the vacuum frame from upright position to horizontal position to deposit the sheet carried thereby upon the conveyor.

3. A sheet feeding apparatus comprising a table provided with a facing of yielding material and with means for supporting a pack of sheets resting thereon in upright position at an angle to the vertical, a conveyor at one side of the table in parallel with the supporting face of the table, a track above the table and belt, a support mounted for movement back and forth along the track, means for moving the support along the track, a depending vertically movable frame carried by the support, means for raising and lowering the support, a vacuum frame pivoted at one end to the depending frame and provided with vacuum engaging means, said frame being adapted to swing from an upright position parallel to the faces of the sheets to a horizontal position parallel to said conveyor, spring means normally holding the frame in said upright position, and means operated on the movement of the support which carries the depending frame away from the table for swinging the vacuum frame from upright position to horizontal position to deposit the sheet carried thereby upon the conveyor.

4. A sheet feeding apparatus comprising a table provided with means for supporting a pack of sheets in upright position at an angle to the vertical, a conveyor at one side of the table in parallel with the supporting face of the table, a track above the table and belt, a support mounted for movement back and forth along the track, means for moving the support along the track, a depending frame carried by the support, a vacuum frame pivoted at one end to the depending frame, said frame being adapted to swing from an upright position parallel to the faces of the sheets to a horizontal position parallel to said belt, a pair of vacuum cups on the vacuum frame one above the other when the frame is in upright position, springs securing the cups to the frame and arranged so that as the vacuum frame swings away from the pack the pull imposed on the plate by one cup is greater than that imposed by the other cup, spring means normally holding the frame in said upright position, and means operated on the movement of the support which carries the depending frame away from the table for swinging the vacuum frame from upright position to horizontal position to deposit the sheet carried thereby upon the conveyor.

5. A sheet feeding apparatus comprising a table provided with means for supporting a pack of sheets in upright position at an angle to the vertical, a conveyor at one side of the table in parallel with the supporting face of the table, a track above the table and belt, a support mounted for movement back and forth along the track, means for moving the support along the track, a depending frame carried by the support, a vacuum frame pivoted at one end to the depending frame and provided with vacuum engaging means, said frame being adapted to swing from an upright position parallel to the faces of the sheets to a horizontal position parallel to said conveyor, springs means normally holding the frame in said upright position, and means operated by the movement of the support as it carries the depending frame away from the table for swinging the vacuum frame from upright position to horizontal position to deposit the sheet carried thereby upon the conveyor.

WILLIAM O. LYTLE.
EMIL A. FUSCA.